US012633171B2

(12) United States Patent
Shliefer

(10) Patent No.: US 12,633,171 B2
(45) Date of Patent: May 19, 2026

(54) INTERNET OF THINGS (IoT) SENSORS FOR AUTOMOBILES

(71) Applicant: Synaptics Incorporated, San Jose, CA (US)

(72) Inventor: Maor Shliefer, Herzliya (IL)

(73) Assignee: Synaptics Incorporated, San Jose, CA (US)

( * ) Notice: Subject to any disclaimer, the term of this patent is extended or adjusted under 35 U.S.C. 154(b) by 189 days.

(21) Appl. No.: 18/459,296

(22) Filed: Aug. 31, 2023

(65) Prior Publication Data

US 2024/0386754 A1 Nov. 21, 2024

Related U.S. Application Data

(60) Provisional application No. 63/502,777, filed on May 17, 2023.

(51) Int. Cl.

| | |
|---|---|
| ***G07C 5/00*** | (2006.01) |
| ***G07C 5/08*** | (2006.01) |
| ***G16Y 20/10*** | (2020.01) |
| ***G16Y 40/10*** | (2020.01) |
| ***G16Y 40/50*** | (2020.01) |

(52) U.S. Cl.

CPC ........... *G07C 5/008* (2013.01); *G07C 5/0808* (2013.01); *G07C 5/0858* (2013.01); *G16Y 20/10* (2020.01); *G16Y 40/10* (2020.01); *G16Y 40/50* (2020.01)

(58) Field of Classification Search

None

See application file for complete search history.

(56) References Cited

U.S. PATENT DOCUMENTS

| | | | | |
|---|---|---|---|---|
| 6,246,211 | B1 | 6/2001 | Dalton et al. | |
| 8,630,768 | B2 | 1/2014 | McClellan et al. | |
| 9,547,976 | B1 * | 1/2017 | Roseman | G08B 21/24 |
| 9,741,224 | B1 * | 8/2017 | Singh | H04B 1/3816 |
| 10,467,877 | B1 * | 11/2019 | Elyakim | G08B 21/22 |
| 11,138,858 | B1 * | 10/2021 | Segal | G08B 25/014 |
| 11,197,129 | B2 | 12/2021 | Dizdarevic et al. | |

* cited by examiner

*Primary Examiner* — Abdhesh K Jha
(74) *Attorney, Agent, or Firm* — Paradice & Li LLP

(57) ABSTRACT

This disclosure provides methods, devices, and systems for achieving connected vehicle functionality. The present implementations more specifically relate to installation-free Internet of things (IoT) sensors for automobiles. In some aspects, an IoT device may include a housing having a power connector configured to interface with an auxiliary power outlet of an automobile and also may include one or more sensors, disposed within the housing, configured to detect changes to a surrounding environment. Example suitable changes may include sounds from the surrounding environment. In some implementations, the IoT device may further include a network interface disposed within the housing and configured to transmit information associated with the detected changes to a wireless communication device. Example suitable information may include a notification about important changes in the automobile's environment.

16 Claims, 6 Drawing Sheets

INTERNET OF THINGS (IoT) SENSORS FOR AUTOMOBILES

CROSS-REFERENCE TO RELATED APPLICATION

This application claims priority and benefit under 35 USC § 119(e) to U.S. Provisional Patent Application No. 63/502,777, filed on May 17, 2023, which is incorporated herein by reference in its entirety.

TECHNICAL FIELD

The present implementations relate generally to Internet of Things (IoT) sensors, and specifically to IoT sensors for automobiles.

BACKGROUND OF RELATED ART

The Internet of Things (IoT) refers to any system that includes a variety of devices, objects, or sensors in communication with one another via the Internet or other communication networks. IoT devices, also referred to as "smart devices," are often used in applications such as connected vehicles, home automation, wearable technology, connected health, and environmental monitoring, among other examples. An example connected vehicle solution allows a user of a vehicle or fleet operator to remotely monitor various telemetry or environmental conditions of the vehicle. For example, the connected vehicle may transmit sensor data to a wireless communication device (such as a tablet, smartphone, or computer) owned or operated by the user.

Many existing connected vehicle solutions rely on sensors that are integrated with an automobile. For example, such sensors are often hardwired to the electrical system of the automobile to receive power from a battery that powers various electrical components of the automobile. However, the wiring of cables into a vehicle's electrical system may require knowledge and expertise that is beyond the capabilities of the most owners or operators of automobiles. As such, hardwired sensors may be difficult (and costly) to replace or install in new and existing automobiles. As demand for connected vehicles continues to grow, there is a need for IoT devices and sensors that can be more readily installed or retrofitted to existing automobiles.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a IoT system for automobiles that includes a housing, one or more sensors, and a network interface. The housing includes an input power connector configured to interface with an auxiliary power outlet of an automobile. The one or more sensors are disposed within the housing and configured to detect sounds from a surrounding environment. The network interface is disposed within the housing and configured to transmit information associated with the detected sounds to a wireless communication device.

Another innovative aspect of the subject matter of this disclosure can be implemented in an IoT system for automobiles that includes a housing, one or more sensors, and network interface. The housing is adapted for insertion into a 12V auxiliary power outlet of an automobile and includes an input power connector configured to interface with the 12V auxiliary power outlet. The one or more sensors are disposed within the housing and configured to detect changes in a surrounding environment. The network interface is disposed within the housing and configured to transmit information associated with the detected changes to a wireless communication device.

Another innovative aspect of the subject matter of this disclosure can be implemented in a method performed by a notification system for automobiles. The method includes receiving sensor data via one or more sensors disposed within a housing adapted for insertion into a 12V auxiliary power outlet of an automobile; determining whether the sensor data matches an event associated with an environment of the automobile; generating a notification based on determining that the sensor data matches an event associated with the environment of the automobile; and transmitting the notification to a wireless communication device.

BRIEF DESCRIPTION OF THE DRAWINGS

The present embodiments are illustrated by way of example and are not intended to be limited by the figures of the accompanying drawings.

DETAILED DESCRIPTION

Figure 1:
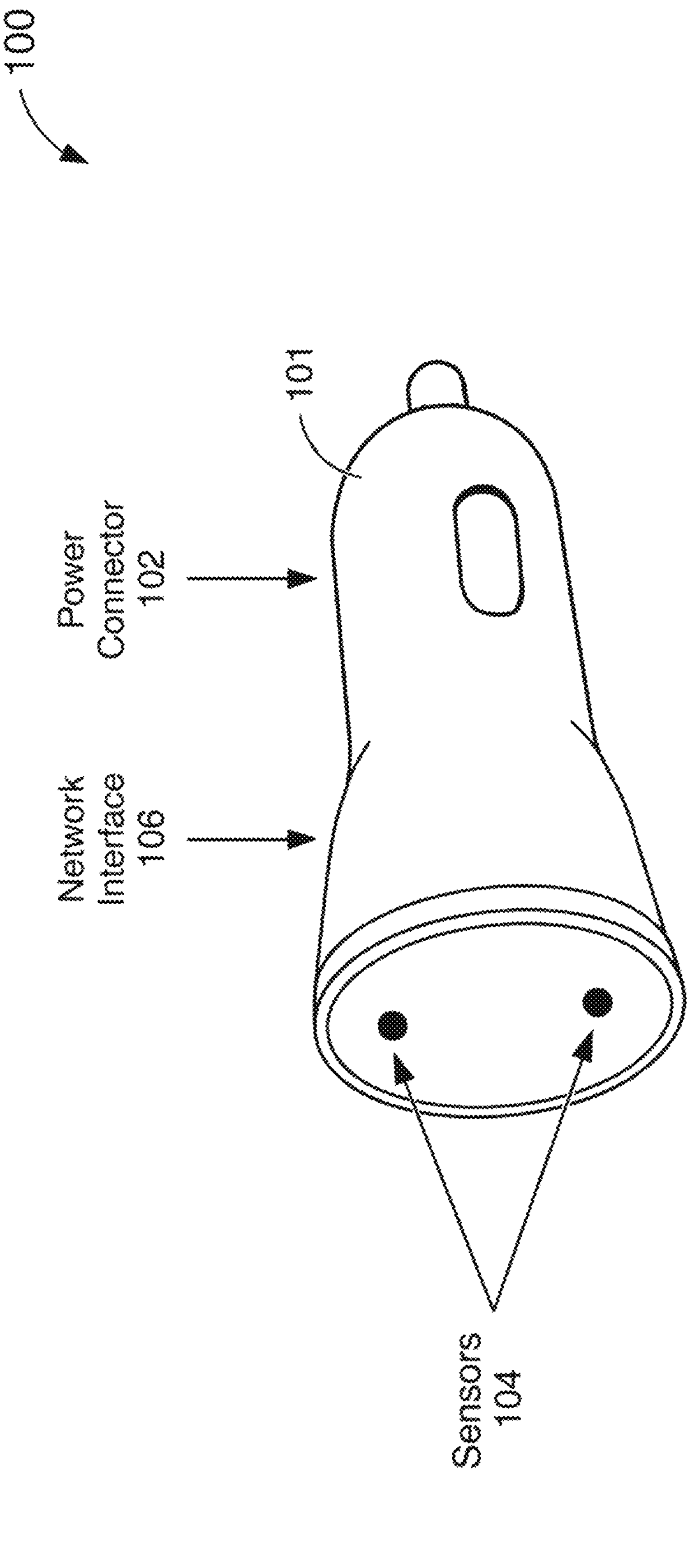
FIG. 1 shows an example Internet of Things (IoT) device, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, many existing connected vehicle solutions rely on sensors that are integrated with an automobile. Such sensors are often hardwired to the electrical system of the automobile to receive power from a battery that powers various electrical components of the automobile. As such, hardwired sensors may be difficult (and costly) to replace or install in new and existing automobiles. However, many automobiles have auxiliary power outlets that are readily accessible to the user or operator of the automobile. Example auxiliary power outlets include cigarette lighter sockets (also referred to as 12V power outlets or 12V accessory outlets), Universal Serial Bus (USB) ports, and on-board diagnostics (OBD) ports, among other examples. Aspects of the present disclosure recognize that the auxiliary power outlets of an automobile have standard connectors that can be used to supply power to various Internet of Things (IoT) sensors without requiring any hardwired installation.

Various aspects relate generally to IoT sensors, and more particularly, to installation-free IoT sensors for automobiles. As used herein, the term "installation-free" refers to various systems and methods for supplying power from an automobile to an IoT sensor without hardwiring the sensor to the electrical system of the automobile. In some aspects, an IoT device may include a housing having a power connector configured to interface with an auxiliary power outlet of an automobile and also may include one or more sensors, disposed within the housing, configured to detect changes to a surrounding environment. Example suitable changes may include sounds from the surrounding environment. In some implementations, the IoT device may further include a network interface disposed within the housing and configured to transmit information associated with the detected changes to a wireless communication device. Example suitable information may include a notification about important changes in the automobile's environment.

Particular implementations of the subject matter described in this disclosure can be implemented to realize one or more of the following potential advantages. By leveraging a vehicle's auxiliary power outlets to supply power to an IoT sensor, aspects of the present disclosure can provide a simple and low-cost solution for adding connected vehicle functionality to most new and existing automobiles. Unlike existing connected vehicle solutions that rely on hardwired sensors, the IoT devices of the present disclosure can add myriad sensors to an automobile in an installation-free manner. By notifying a user about important changes in a vehicle's environment, aspects of the present disclosure may prevent loss or injury to various objects or people inside the vehicle (or to the vehicle itself). For example, in some implementations, the IoT device can detect the sounds of a crying child and notify the user that a child may have been left inside the vehicle. In some other implementations, the IoT device can detect the sounds of breaking glass and notify the user that a thief may be by attempting to break into the vehicle.

FIG. 1 shows an example IoT device 100, according to some implementations. The IoT device 100 is configured to provide connected vehicle functionality for an automobile in an installation-free manner. For example, in some implementations, the IoT device 100 may connect to an auxiliary power outlet of the automobile.

The IoT device 100 includes a housing 101, a power connector 102, one or more sensors 104, and a network interface 106. The power connector 102 is integrated with the housing 101 and adapted to connect or otherwise interface with the auxiliary power outlet of the automobile. In the example of FIG. 1, the power connector 102 is depicted as a cigarette lighter adapter that conforms to, or is otherwise configured to be inserted into, a 12V auxiliary power outlet (or cigarette lighter socket) of the automobile. In some other implementations, the power connector 102 may be a Universal Serial Bus (USB) connector that is configured to be electrically coupled to a USB port of the automobile. Still further, in some implementations, the power connector 102 may be an on-board diagnostics (OBD) connector that is configured to be inserted into an OBD (or OBD-II) port of the automobile.

The sensors 104 may include any sensors capable of detecting changes in a surrounding environment. In some implementations, the sensors 104 may include one or more microphones that are configured to detect sounds (or acoustic waves) propagating through the environment. For example, the microphones may convert the detected acoustic waves to an electrical signal (also referred to as an "audio signal") representative of the acoustic waveform. In some other implementations, the sensors 104 may be configured to detect environmental changes based on various other types of sensor technology. Example suitable sensor technology may include photosensors, temperature sensors, accelerometers, gyroscopes, and position sensors, among other examples. Accordingly, the sensors 104 may be collectively referred to herein as "IoT sensors."

The network interface 106 is configured to communicate with one or more wireless communication devices (not shown for simplicity). A wireless communication device may be any device capable of displaying or otherwise notifying a user about changes to the environment of an automobile. Example suitable wireless communication devices include, among other examples, mobile phones (or smartphones), personal digital assistants (PDAs), laptop computers, tablet computers, desktop computers, and various other audio or display devices. In some implementations, the network interface 106 may include Wi-Fi transmitters, Bluetooth transmitters, cellular transmitters, or any transmitters utilizing various other suitable radio frequency (RF) technologies (such as ZigBee or near-field communication (NFC), among other examples) to transmit information to the wireless communication device.

In some aspects, the information transmitted by the network interface 106 may be associated with sensor data output by the sensors 104 based on changes in the surrounding environment. In some implementations, the information may include the raw sensor data output by the sensors 104. In some other implementations, the information may include a notification about an event associated with the automobile environment. In such implementations, the IoT device 100 (or a processing system associated therewith) may analyze the data output by the sensors 104 to determine whether the data matches a predetermined event associated with the automobile environment. Example suitable events may include, among other examples, a child crying in the automobile, automobile glass being broken or shattered, or various other events associated with danger or violence (such as a firearm being discharged (also referred to as a "gunshot"), a car crash, an explosion, or a person screaming or crying for help). In some implementations, the network interface 106 may transmit the notification to the wireless communication device only if the sensor data matches a predetermined event.

Figure 2:
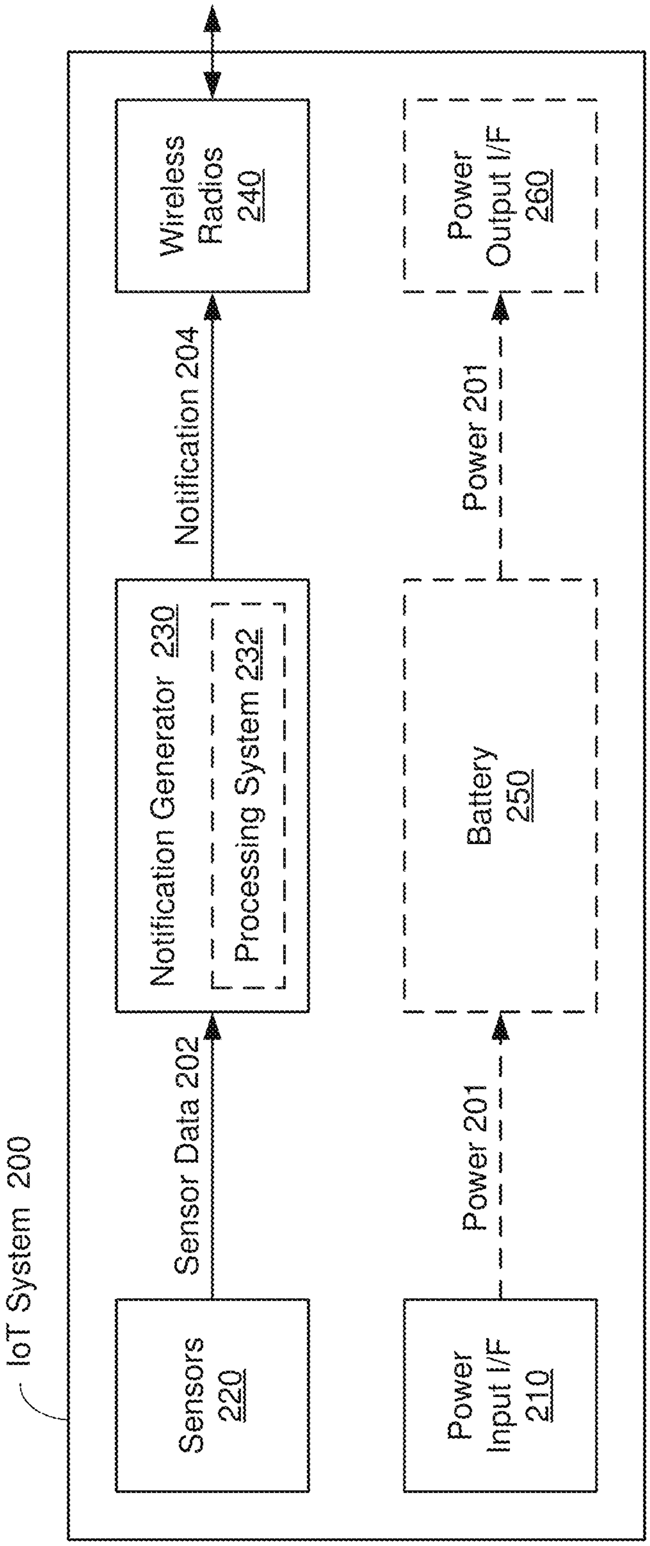
FIG. 2 shows a block diagram of an example IoT system, according to some implementations.

FIG. 2 shows a block diagram of an example IoT system 200, according to some implementations. The IoT system 200 is configured to provide connected vehicle functionality for an automobile in an installation-free manner. In some implementations, the IoT system 200 may be one example of the IoT device 100 of FIG. 1. Thus, the IoT system 200 may be configured to connect to an auxiliary power outlet of an automobile.

The IoT system 200 includes a power input interface (I/F) 210, one or more sensors 220, a notification generator 230, and one or more wireless radios 240. The power input interface 210 is configured to connect or otherwise interface with the auxiliary power outlet of the automobile to receive power 201 from the automobile. The power input interface 210 may distribute the power 201 to various other components of the IoT system 200 (such as the sensors 220, the notification generator 230, and the wireless radios 240). In some implementations, the power input interface 210 may be one example of the power connector 102 of FIG. 1. For example, the power input interface 210 may be, or include, a cigarette lighter adapter, a USB connector, or an OBD connector, among other examples.

The sensors 220 are configured to detect changes in a surrounding environment. More specifically, the sensors 220 may produce or otherwise output sensor data 202 based on changes in the environment. In some implementations, the sensors 220 may be examples of the sensors 104 of FIG. 1. For example, the sensors 220 may include one or more microphones configured to detect sounds in the environment. As such, the sensor data 202 may include audio signals representing the detected sound. Alternatively, or in addition, the sensors 220 may include IoT sensors that implement various other types of sensor technology (such as photosensors, temperature sensors, accelerometers, gyroscopes, or position sensors, among other examples).

The notification generator 230 is configured to selectively generate a notification 204 based, at least in part, on the sensor data 202. In some implementations, the notification 204 may indicate an event associated with the automobile environment. The event may represent a classification of the changes detected in the surrounding environment. More specifically, the event may be any suitable event that can be classified or inferred from the sensor data 202. Example suitable events may include a child crying in the automobile, automobile glass being broken or shattered, or various other events associated with danger or violence, among other examples. Thus, the notification generator 230 may generate a notification 204 only if the sensor data 202 matches a known event. In some aspects, the notification generator 230 may include a processing system 232 configured to determine whether the sensor data 202 matches one or more events associated with the automobile environment. In some other aspects, the classification of the sensor data 202 may be performed by a remote processing system external to the IoT system 200.

In some implementations, the processing system 232 (or remote processing system) may compare the values of the sensor data 202 with one or more predetermined thresholds associated with known events. For example, the processing system may detect a matching event if the values of the sensor data 202 are above or below a predetermined threshold. In some other implementations, the processing system 232 (or remote processing system) may perform statistical analysis on the sensor data 202 to determine whether the sensor data 202 matches a statistical model associated with a matching event. Still further, in some implementations, the processing system 232 (or remote processing system) may perform a machine learning operation that produces an inference, based on a trained machine learning model, indicating whether the sensor data 202 matches a known event. In such implementations, the machine learning model may be trained based on sensor data captured via one or more sensors located within an automobile environment (such as a cabin of the automobile).

The wireless radios 240 are configured to transmit the notification 204 to one or more wireless communication devices. In some implementations, the wireless radios 240 may be one example of the network interface 106 of FIG. 1. For example, the wireless radios 240 may be, or include, a Wi-Fi transmitter, a Bluetooth transmitter, a cellular transmitter, or any transmitter utilizing various other suitable RF technologies (such as Zigbee or NFC). In some implementations, the wireless radios 240 may transmit the sensor data 202 to a remote processing system. In such implementations, the wireless radios 240 may further receive, from the remote processing system, an indication of whether the sensor data 202 matches an event associated with the automobile environment, and the notification generator 230 may generate the notification 204 based on the indication received from the remote processing system.

Aspects of the present disclosure recognize that some auxiliary power outlets may be electrically decoupled from a power source (or battery) of the automobile when the automobile is turned off (such as when the key is not in the ignition). In such instances, the IoT system 200 may be unable to receive power via the power input interface 210. Thus, in some implementations, the IoT system 200 may include a battery 250 to supply power to the various components (such as the sensors 220, the notification generator 230, and the wireless radios 240) when the automobile is turned off. For example, the battery 250 can be charged (or recharged) using the power 201 received via the power input interface 210 when the automobile is turned back on.

Aspects of the present disclosure also recognize that many users utilize the auxiliary power outlets of their automobiles to power other accessory devices (such as mobile phones, tablets, and dashboard cameras, among other examples). Thus, in some implementations, the IoT system 200 may further include a power output interface (I/F) 260 to supply power 201 to an external device. For example, the power output interface 260 may be coupled to the power input interface 210 to receive the power 201 from the automobile. In some implementations, the power output interface 260 may be further coupled to the battery 250 so that the power output interface 260 can supply power to the external device even when the automobile is turned off.

Figure 3:
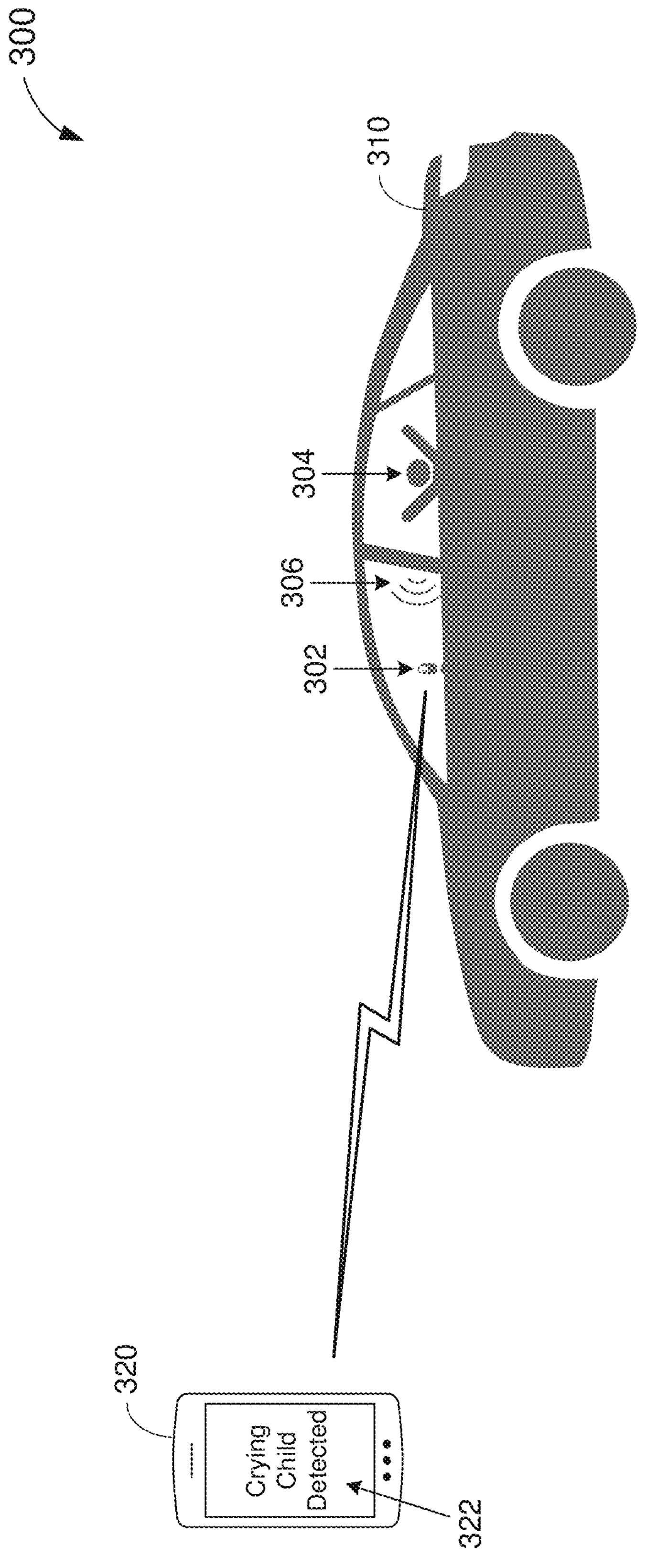
FIG. 3 shows an example environment in which an installation-free IoT device for automobiles can be implemented.

FIG. 3 shows an example environment 300 in which an installation-free IoT device 302 for automobiles can be implemented. In some implementations, the IoT device 302 may be one example of the IoT device 100 of FIG. 1 or the IoT system 200 of FIG. 2. More specifically, in the example of FIG. 3, the IoT device 302 is configured to alert a user associated with an automobile 310 (such as an owner or operator of the automobile) about the sounds of crying children detected in the automobile 310.

As shown in FIG. 3, the IoT device 302 is connected to an auxiliary power outlet of the automobile 310 (such as a 12V auxiliary power outlet, a USB port, or an OBD port). The IoT device 302 detects sounds 306 from a child 304 in the automobile 310 and determines that the sounds 306 are associated with a crying child. In some implementations, the IoT device 302 may determine that the amplitude or volume of the sounds 306 exceeds a threshold associated with crying children. In some other implementations, the IoT device 302 may determine that one or more statistical properties of the sounds 306 matches a statistical model associated with crying children. Still further, in some implementations, the IoT device 302 may infer that the sounds 306 are produced by a crying child based on a machine learning model. For example, the machine learning model may be trained based on sensor data capturing sounds of crying children in automobile environments (such as in the cabins of various automobiles).

The IoT device 302 generates a notification 322 based on the detected child crying event and transmits the notification 322 to a wireless communication device 320 associated with the user of the automobile 310. In the example of FIG. 3, the notification 322 is depicted as a message indicating that a crying child has been detected in the automobile 310. However, in actual implementations, the notification 322 may include various other information (such as in the form of lights, sounds, or other outputs) that can alert the user to the presence of the crying child 304. In this manner, the IoT device 320 may be used to prevent harm or injury to the child 304 left behind in the automobile 310.

Figure 4:
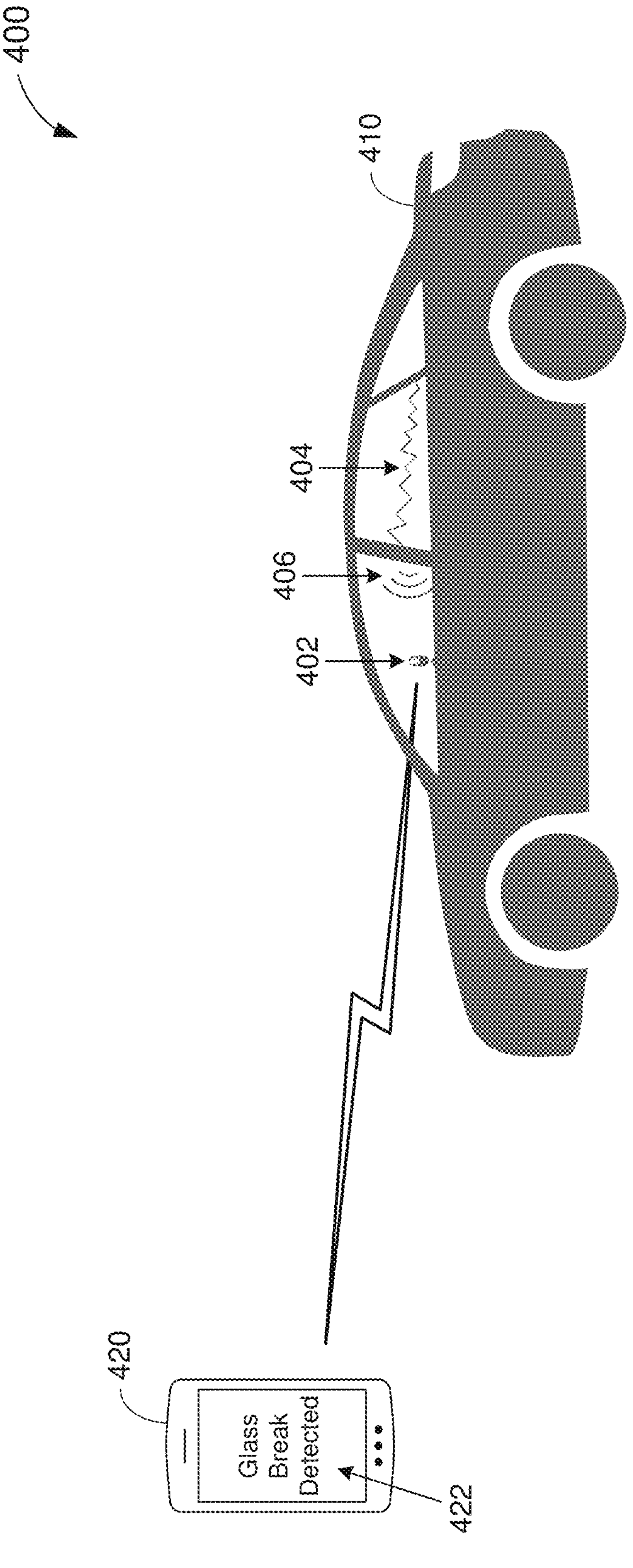
FIG. 4 shows another example environment in which an installation-free IoT device for automobiles can be implemented.

FIG. 4 shows another example environment 400 in which an installation-free IoT device 402 for automobiles can be implemented. In some implementations, the IoT device 402 may be one example of the IoT device 100 of FIG. 1 or the IoT system 200 of FIG. 2. More specifically, in the example of FIG. 4, the IoT device 402 is configured to alert a user associated with an automobile 410 (such as an owner or operator of the automobile) about the sounds of breaking glass detected in the automobile 410.

As shown in FIG. 4, the IoT device 402 is connected to an auxiliary power outlet of the automobile 410 (such as a 12V auxiliary power outlet, a USB port, or an OBD port). The IoT device 402 detects sounds 406 from a window glass 404 of the automobile 410 and determines that the sounds 406 are associated with glass breaking or shattering. In some implementations, the IoT device 402 may determine that the amplitude or volume of the sounds 406 exceeds a threshold associated with breaking glass. In some other implementations, the IoT device 402 may determine that one or more statistical properties of the sounds 406 matches a statistical model associated with breaking glass. Still further, in some implementations, the IoT device 402 may infer that the sounds 406 are produced by breaking glass based on a machine learning model. For example, the machine learning model may be trained based on sensor data capturing sounds of automobile glass breaking (such as from inside the cabins of various automobiles).

The IoT device 402 generates a notification 422 based on the detected glass breaking event and transmits the notification 422 to a wireless communication device 420 associated with the user of the automobile 410. In the example of FIG. 4, the notification 422 is depicted as a message indicating that a breaking of glass has been detected in the automobile 410. However, in actual implementations, the notification 422 may include various other information (such as in the form of lights, sounds, or other outputs) that can alert the user to the breaking of the window glass 404. In this manner, the IoT device 420 may be used to prevent the automobile 410 (or any objects therein) from being stolen by thieves.

Figure 5:
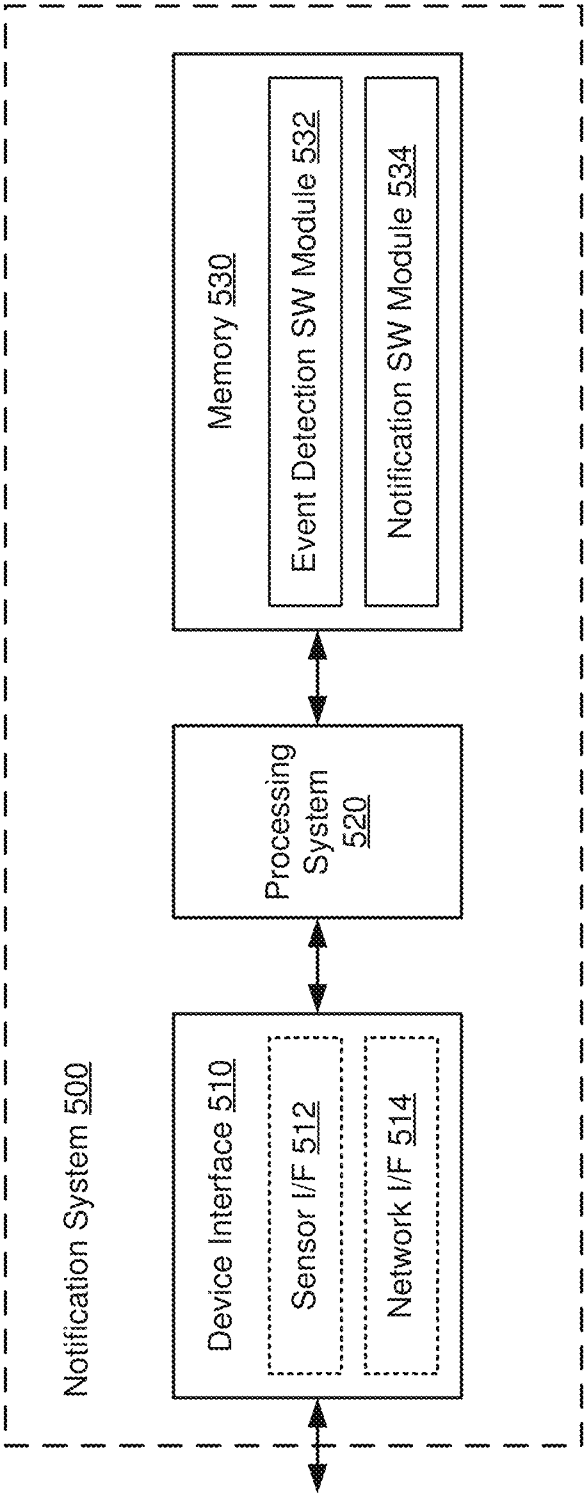
FIG. 5 shows a block diagram of an example notification system for automobiles, according to some implementations.

FIG. 5 shows a block diagram of an example notification system 500 for automobiles, according to some implementations. The notification system 500 is configured to generate notifications based on changes to an automobile environment. In some implementations, the notification system 500 may be one example of the notification generator 230 of FIG. 2. Thus, the notification system 500 may be implemented by an installation-free IoT device.

The notification system 500 includes a device interface 510, a processing system 520, and a memory 530. The device interface 510 is configured to communicate with one or more components of the IoT device. In some aspects, the device interface 510 may include a sensor interface (I/F) 512 configured to communicate with one or more sensors (such as the sensors 220 of FIG. 2) and a network interface (I/F) 514 configured to communicate with one or more wireless radios (such as the wireless radios 240 of FIG. 2). In some implementations, the sensor interface 512 may receive sensor data via one or more sensors disposed within a housing adapted for insertion into a 12V auxiliary power outlet of an automobile.

The memory 530 may include a non-transitory computer-readable medium (including one or more nonvolatile memory elements, such as EPROM, EEPROM, Flash memory, or a hard drive, among other examples) that may store at least the following software (SW) modules:

- an event detection SW module 532 to determine whether the received sensor data matches an event associated with an environment of the automobile; and
- a notification SW module 534 to generate a notification based on determining that the sensor data matches an event associated with the environment of the automobile and to transmit the notification to a wireless communication device.

Each software module includes instructions that, when executed by the processing system 520, causes the notification system 500 to perform the corresponding functions.

The processing system 520 may include any suitable one or more processors capable of executing scripts or instructions of one or more software programs stored in the notification system 500 (such as in the memory 530). For example, the processing system 520 may execute the environmental change detection SW module 532 to determine whether the received sensor data matches an event associated with an environment of the automobile. The processing system 520 also may execute the notification SW module 534 to generate a notification based on determining that the sensor data matches an event associated with the environment of the automobile and to transmit the notification to a wireless communication device.

Figure 6:
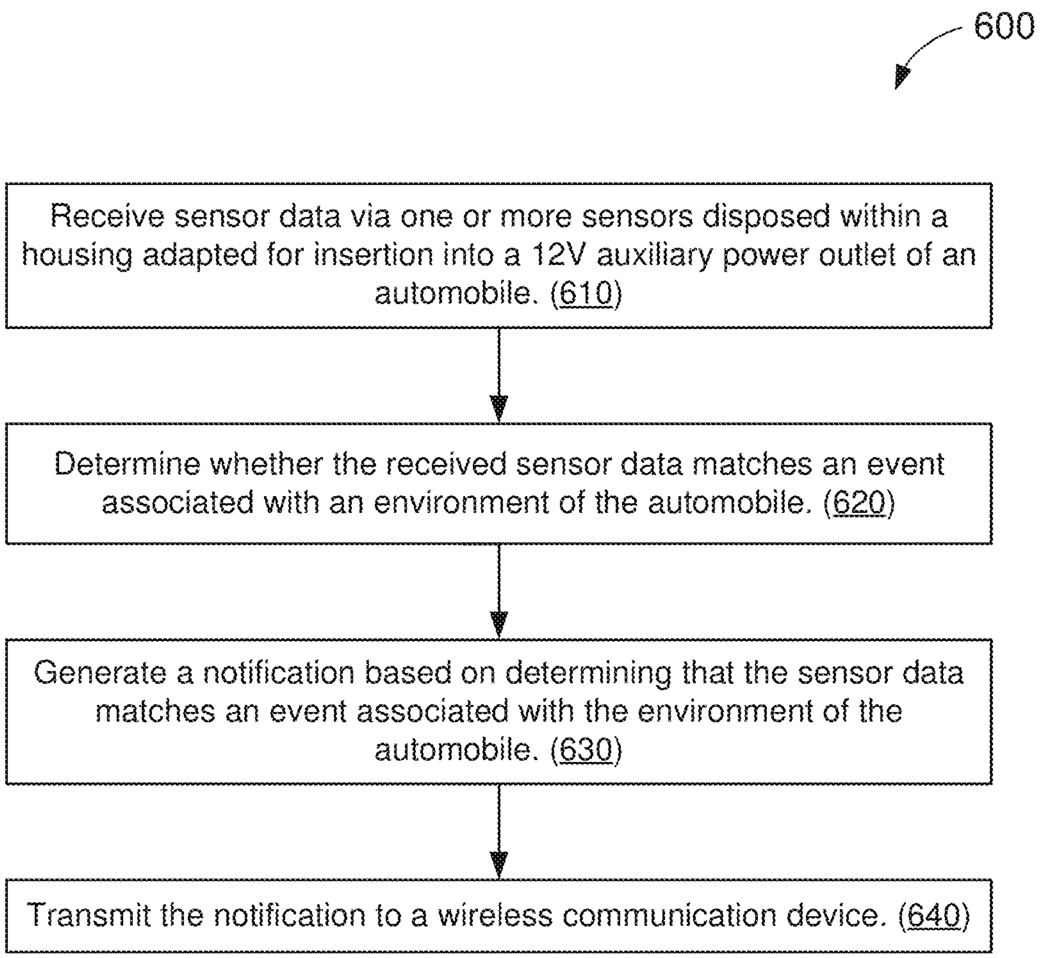
FIG. 6 shows an illustrative flowchart depicting an example operation for notifying users of changes to automobile environments, according to some implementations.

FIG. 6 shows an illustrative flowchart depicting an example operation 600 for notifying users of changes to automobile environments, according to some implementations. In some implementations, the example operation 600 may be performed by a notification system such as the notification generator 230 of FIG. 2 or the notification system 500 of FIG. 5.

The notification system receives sensor data via one or more sensors disposed within a housing adapted for insertion into a 12V auxiliary power outlet of an automobile (610). The notification system determines whether the received sensor data matches an event associated with an environment of the automobile (620). In some aspects, the sensor data may include sounds associated with the environment of the automobile. In some implementations, the event may be associated with breaking glass. In some other implementations, the event may be associated with a child crying. The notification system generates a notification based on determining that the sensor data matches an event associated with the environment of the automobile (630). The notification system further transmits the notification to a wireless communication device (640).

In some implementations, the notification generator may determine that the sensor data matches an event associated with the environment of the automobile based at least in part on a machine learning model. In some other implementations, the notification generator may transmit the sensor data to an external processing system and receive, from the external processing system, an indication of whether the sensor data matches an event associated with the environment of the automobile.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A system comprising:

a housing including an input power connector configured to interface with an auxiliary power outlet of an automobile;

a microphone and one or more sensors disposed within the housing, the microphone configured to detect sounds from a surrounding environment and the one or more sensors including a photosensor, a temperature sensor, an accelerometer, a gyroscope, or a position sensor;

a processing system disposed within the housing and configured to infer, from the detected sounds and data received from the one or more sensors, an event occurring in the surrounding environment using a machine learning model trained using sensor data from multiple sensor types within an automobile environment; and a network interface disposed within the housing and configured to transmit information derived from the event to a wireless communication device.

2. The system of claim 1, wherein the auxiliary power outlet comprises a 12V auxiliary power outlet and the housing is adapted for insertion into the 12V auxiliary power outlet.

3. The system of claim 1, wherein the auxiliary power outlet comprises a Universal Serial Bus (USB) port or an on-board diagnostics (OBD) port.

4. The system of claim 1, wherein the system further comprises:

a notification generator configured to selectively generate a notification based on whether the detected sounds match the event associated with the surrounding environment, the information transmitted by the network interface including the notification.

5. The system of claim 4, wherein the event is associated with breaking glass.

6. The system of claim 4, wherein the event is associated with a child crying.

7. The system of claim 1, wherein the system further comprises:

a battery disposed within the housing and coupled to the input power connector, the battery being configured to receive charge via the auxiliary power outlet of the automobile and supply power to the one or more sensors.

8. A system comprising:

a housing adapted for insertion into a 12V auxiliary power outlet of an automobile, the housing including an input power connector configured to interface with the 12V auxiliary power outlet;

a plurality of sensors disposed within the housing and configured to detect changes in a surrounding environment, the plurality of sensors including a microphone and at least one of a photosensor, a temperature sensor, an accelerometer, a gyroscope, or a position sensor;

a processing system disposed within the housing and configured to infer, based on the detected changes, an event occurring in the surrounding environment using a machine learning model trained using sensor data from multiple sensor types within an automobile environment; and a network interface disposed within the housing and configured to transmit information derived from the event to a wireless communication device.

9. The system of claim 8, wherein the detected changes include sounds from the surrounding environment and data received from the photosensor, the temperature sensor, the accelerometer, the gyroscope, or the position sensor.

10. The system of claim 8, wherein the system further comprises:

a notification generator configured to selectively generate a notification based on whether the detected changes match the event associated with the surrounding environment, the information transmitted by the network interface including the notification.

11. The system of claim 10, wherein the event is associated with breaking glass.

12. The system of claim 10, wherein the event is associated with a child crying.

13. The system of claim 8, wherein the system further comprises:

a battery disposed within the housing and coupled to the input power connector, the battery being configured to receive charge via the 12V auxiliary power outlet of the automobile and supply power to the one or more sensors.

14. A method for notifying users of changes to automobile environments, comprising:

receiving sensor data from a plurality of sensors disposed within a housing adapted for insertion into a 12V auxiliary power outlet of an automobile, the plurality of sensors including at least two of a microphone, a photosensor, a temperature sensor, an accelerometer, a gyroscope, and a position sensor;

inferring, based on the received sensor data, an event occurring in an environment of the automobile using a machine learning model trained using sensor data from multiple sensor types within an automobile environment;

generating a notification based on the inference; and transmitting the notification to a wireless communication device.

15. The system of claim 1, wherein:

the one or more sensors include the photosensor;

the event is inferred from the detected sounds and data received from the photosensor; and the machine learning model is trained using microphone sensor data and photosensor data.

16. The system of claim 1, wherein:

the one or more sensors include the temperature sensor;

the event is inferred from the detected sounds and data received from the temperature sensor; and the machine learning model is trained using microphone sensor data and temperature sensor data.

* * * * *